UNITED STATES PATENT OFFICE

2,276,547

OXIDATION PRODUCTS OF THE CYCLO-PENTANO - POLYHYDROPHENANTHRENE SERIES AND PROCESS OF MAKING SAME

Leopold Ruzicka, Zurich, Switzerland, assignor, by mesne assignments, to Ciba Pharmaceutical Products, Incorporated, Summit, N. J., a corporation of New Jersey No Drawing. Application June 21, 1938, Serial No. 215,056. In Switzerland June 28, 1937

12 Claims. (Cl. 260—397.1)

According to this invention oxidation products of the cyclopentano-polyhydrophenanthrene series can be made by splitting by oxidation an acetylene linkage present in a side chain of a compound of the cyclopentano-polyhydrophenanthrene series having a saturated or unsaturated nucleus, if required with temporary protection of substituents capable of being oxidized, such as hydroxyl or amino-groups, and of any nuclear double linkages which may be present.

There may be used as parent materials for the invention quite generally steroids (mono- or dimethyl- cyclopentano - polyhydrophenanthrene compounds) containing at 17-position an unsaturated side chain, for example

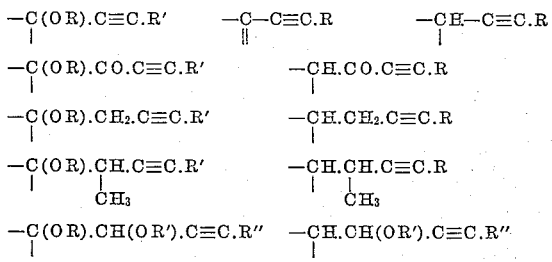

In the foregoing formulae R, R' and R" represent for example hydrogen, a substituted or unsubstituted hydrocarbon radical, acyl or carboxyl group. The hydroxyl group which may be attached to the same nuclear carbon atom may be free or may be substituted by an ester or ether radical. Compounds of the kind described may be obtained for example by the action of organometallic compounds derived from acetylene, such as acetylene sodium, acetylene magnesium bromide, on ketones, aldehydes, acid halides, nitriles, halides and so one of the cyclopentano-polyhydrophenanthrene series, or alternatively they may be obtained for example by the reaction of unsaturated halides with magnesium halides and similar compounds of the cyclopentano-polyhydrophenanthrene series.

Besides the unsaturated side chains the parent materials may contain other nuclear substituents for example free or substituted hydroxyl, carbinol or amino-groups, furthermore keto-groups or their enol derivatives, halogen atoms, hydrocarbon residues and so on. The ring nucleus may furthermore contain one or more unsaturated linkages.

When any oxidizable substituents are present in the nucleus and in the side chains, such as hydroxyl, carbinol or amino-groups, they are advantageously withdrawn from the action of the oxidizing agent by substitution when their simultaneous oxidation is not desired. Likewise any nuclear double linkages which may be present are advantageously temporarily protected unless such protection appears unnecessary owing to the particular stability of the atomic grouping in question, for example in the case of an $\alpha:\beta$-unsaturated ketone. Generally this protection is secured by the addition of halogen or halogenhydride. The surprising observation has been made that it is possible to saturate only the nucleus with halogen or halogen-hydride and to maintain the slowly reacting unsaturated groups in the side chain. After the oxidation an agent capable of removing halogen or halogenhydride, for example zinc dust and acetic acid, zinc dust and an alcohol or an alkali-iodide and benzene on the one hand, or a tertiary base such as pyridine or dimethylaniline, or an alkali or a salt of an organic acid on the other hand is caused to react for producing the nuclear double linkages.

The oxidative splitting in the acetylene compounds may be brought about in manner itself known, for example by the action of ozone and splitting of the resulting ozonide, or by the action of chromic acid, nitric acid, a persulfate or a peroxide such as perbenzoic acid or hydrogen peroxide, advantageously in presence of osmium tetroxide, by the attachment of oxygen or nitrogen tetroxide and splitting of the addition product, and so on.

The oxidation products, carboxylic acids or aldehydes so obtained may be purified by physical methods such as recrystallisation, distillation or adsorption or by utilizing their specific reactive groups, for example by way of their salts or their condensation products with carbonyl reagents. The products are themselves therapeutically valuable compounds or they are important parent materials for the production for example of compounds of the progesterone and corticosterone series.

The following examples illustrate the invention, the parts being by weight:

*Example 1*

1 part of 3-acetoxy-17-ethinyl-androstanol-(17) of melting point 205–207° C., obtainable for example according to Ruzicka & Hofmann, Helv. Chim. Acta, vol. 20, page 1282 (1937), is dissolved in 50 parts of chloroform and the solution is treated with ozone for 1 hour at 0° C. The solvent is then evaporated at room temperature under reduced pressure and the residue is treated with water. The reaction product is taken up in ether and the acid fraction is extracted from the ethereal solution with alkali solution. By acidifying the alkaline extract there is obtained 3 - acetoxy - 17 - hydroxy-aetio-allocholanic acid which after recrystallization from aqueous acetone melts at 258–260° C.

The same acid can be obtained by the attachment of two hydroxyl groups by means of permanganate and subsequent oxidation with chromic acid. By alkaline saponification it yields the 3:17-dihydroxy-aetio-allo-cholanic acid.

Example 2

1 part of $\Delta^{5:6}$-3-acetoxy-17-ethinyl-androstenol-(17) of melting point 175–176° C., obtainable for example according to Ruzicka & Hofmann, Helv. Chim. Acta, vol. 20, page 1281 (1937), is dissolved in 50 parts of glacial acetic acid, 0.45 part of bromine is added and the whole is treated at room temperature with Ozone. 5 parts of zinc dust are then added and the whole is heated for a short time on the water bath. It is then filtered, concentrated under reduced pressure and the reaction product is precipitated by the addition of water and is taken up in ether. From the ethereal solution the acid fraction is extracted by shaking with dilute alkali solution. By acidifying the aqueous solution there is obtained $\Delta^{5:6}$-3-acetoxy-17-hydroxy-aetio-cholenic acid which after recrystallization from dilute methyl alcohol and dilute acetone melts at 230–232° C.

Example 3

1 part of $\Delta^{5:6}$-3:17-diacetoxy-17-ethinyl-androstene of melting point 169–169.5° C., obtainable for example according to Ruzicka & Hofmann, Helv. Chim. Acta, vol. 20, page 1281 (1937), is dissolved in 50 parts of glacial acetic acid, 0.4 part of bromine is added and the whole is treated with ozone at room temperature. The product is then de-brominated by heating on the water bath with zinc dust. The whole is filtered, concentrated under reduced pressure and the reaction product is precipitated by addition of water and taken up in ether. The ethereal solution is extracted with dilute caustic soda solution and $\Delta^{5:6}$-3:17-diacetoxy-aetio-cholenic acid is precipitated from the alkaline extract by the addition of hydrochloric acid, the melting point being 246° C.

Example 4

5 parts of $\Delta^{5:6}$-3-trans-acetoxy-17-hydroxy-17-ethinyl-androstene, obtainable for example according to Ruzicka & Hofmann, Helv. Chim. Acta., vol. 20, page 1281 (1937), are dissolved in 150 parts of carbon tetrachloride and mixed with a solution of 2.2 parts of bromine in carbon tetrachloride while cooling with ice. After the bromine has been used up, the solution is ozonized for several hours, the ozonides thus formed are split by mixing them with 2 parts of water and slight heating on the water bath, and the solvent is sucked off in a vacuum. The residue is dibrominated with zinc in a solution of glacial acetic acid, the solution is filtered, mixed with water and extracted with ether. The acid portion is withdrawn from the ethereal solution and after further purification esterified with diazomethane. There is thus obtained $\Delta^{5:6}$-3-trans-acetoxy-17-hydroxy-aetio-cholenic acid-methyl ester of melting point 163–164° C. It may be recrystallized from methanol or also sublimated in a high vacuum. By saponifying this ester there is obtained the dihydroxy-cholenic acid of melting point 260–261° C. Its methyl ester melts at 190–191° C., its diacetate at 220–220.5° C. and its diacetyl-methylester at 145–145.5° C. From the first named methyl ester there is obtained by mild acetylation an acetate of melting point 201–202° C., which is different from the above named 3-acetate.

What I claim is:

1. A process for the manufacture of oxidation products of the cyclopentano-polyhydrophenanthrene series, comprising splitting by oxidation an acetylene linkage present in a side chain at 17-position of a compound containing a cyclopentano-polyhydrophenanthrene nucleus.

2. A process for the manufacture of oxidation products of the cyclopentano-polyhydrophenanthrene series, comprising splitting by oxidation an acetylene linkage present in a side chain at 17-position of a compound containing a saturated cyclopentano-polyhydrophenanthrene nucleus.

3. A process for the manufacture of oxidation products of the cyclopentano-polyhydrophenanthrene series, comprising splitting by oxidation an acetylene linkage present in a side chain at 17-position of a compound containing a saturated cyclopentano - polyhydrophenanthrene nucleus with temporary protection of oxidizable substituents.

4. A process for the manufacture of oxidation products of the cyclopentano-polyhydrophenanthrene series, comprising splitting by oxidation an acetylene linkage present in a side chain at 17-position of a compound containing an unsaturated cyclopentano-polyhydrophenanthrene nucleus with temporary protection of the nuclear double linkages.

5. A process for the manufacture of oxidation products of the cyclopentano-polyhydrophenanthrene series, comprising splitting by oxidation an acetylene linkage present in a side chain at 17-position of a compound containing an unsaturated cyclopentano-polyhydrophenanthrene nucleus with temporary protection of the nuclear double linkages and of oxidizable substituents.

6. A process for the manufacture of oxidation products of the cyclopentano-polyhydrophenanthrene series, comprising splitting by oxidation with ozone the acetylene linkage present in $\Delta^{5:6}$-3,17-dihydroxy-17-ethinyl-androstenes with temporary protection of the nuclear double linkages by bromine and of the hydroxyl groups by acylation.

7. The oxidation products obtainable by splitting by oxidation the acetylene linkage of a compound containing at the same carbon atom in 17-position of its cyclopentano-polyhydrophenanthrene nucleus a side chain with an acetylene linkage and a member of the group consisting of a free, an esterified and etherified hydroxyl group.

8. The compounds of the cyclopentano-polyhydrophenanthrene series containing in the 17-position a carboxyl group and a member of the group consisting of a free, an esterified and etherified hydroxyl group.

9. The compounds of the dimethyl-cyclopentano-polyhydrophenanthrene series containing in the 17-position a carboxyl group and in the 3- and 17-positions a member of the group consisting of a free, an esterified and etherified hydroxyl group.

10. The 3:17-dihydroxy - aetio - allo - cholanic acid.

11. The $\Delta^{5:6}$-3:17- dihydroxy - aetio - cholenic acid.

12. Compounds of the cyclopentano-polyhydrophenanthrene series containing at the 17-position a hydroxyl group and a carboxyl group.

LEOPOLD RUZICKA.